(12) United States Patent
Bull et al.

(10) Patent No.: US 9,664,242 B2
(45) Date of Patent: May 30, 2017

(54) DISC BRAKE

(71) Applicant: Meritor Heavy Vehicle Braking Systems (UK) Limited, Cwmbran, Gwent (GB)

(72) Inventors: Adrian Bull, Gwent (GB); Paul Anthony Thomas, Gwent (GB)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 470 days.

(21) Appl. No.: 13/925,241

(22) Filed: Jun. 24, 2013

(65) Prior Publication Data

US 2014/0000991 A1    Jan. 2, 2014

(30) Foreign Application Priority Data

Jul. 2, 2012   (GB) .................................. 1211722.2

(51) Int. Cl.
| | |
|---|---|
| F16D 55/08 | (2006.01) |
| F16D 55/226 | (2006.01) |
| F16D 65/092 | (2006.01) |
| F16D 55/00 | (2006.01) |

(52) U.S. Cl.
CPC ....... *F16D 55/226* (2013.01); *F16D 55/2262* (2013.01); *F16D 65/092* (2013.01); *F16D 2055/0008* (2013.01)

(58) Field of Classification Search
CPC ............. F16D 2055/002; F16D 65/092; F16D 2055/007; F16D 55/226
USPC .................................. 188/72.31, 73.39, 72.1
See application file for complete search history.

(56) References Cited

U.S. PATENT DOCUMENTS

| | | | | |
|---|---|---|---|---|
| 3,920,104 | A | * | 11/1975 | Hoffmann .................. 188/73.31 |
| 3,924,711 | A | * | 12/1975 | Hoffmann et al. ........ 188/73.43 |
| 6,189,659 | B1 | * | 2/2001 | Doi et al. ................... 188/73.35 |
| 2007/0017756 | A1 | * | 1/2007 | Takeo et al. ............... 188/73.39 |
| 2007/0267256 | A1 | * | 11/2007 | Blatt et al. ................. 188/73.31 |
| 2010/0147639 | A1 | | 6/2010 | Roberts et al. | |

FOREIGN PATENT DOCUMENTS

| | | |
|---|---|---|
| EP | 0752541 A1 | 1/1997 |
| EP | 1473481 A1 | 11/2004 |
| EP | 2256360 A1 | 12/2010 |
| JP | 08177898 A | 7/1996 |
| WO | 2007051616 A1 | 5/2007 |
| WO | 2009112249 A2 | 9/2009 |

OTHER PUBLICATIONS

European Patent Office, Extended Search Report for the corresponding European Patent Application No. 13174111.8 mailed Oct. 10, 2013.
European Patent Office, Search Report for the corresponding Great Britain Patent Application No. GB1211722.2 dated Oct. 25, 2012.

* cited by examiner

*Primary Examiner* — Robert A Siconolfi
*Assistant Examiner* — Mahbubur Rashid
(74) *Attorney, Agent, or Firm* — Brooks Kushman P.C.

(57) ABSTRACT

A disc brake having an actuation mechanism, a disc brake rotor, first and second brake pad mounting structures, and first and second brake pads. The first and second mounting structures may have formations that affect fitting of the first and second pads.

20 Claims, 11 Drawing Sheets

DISC BRAKE

TECHNICAL FIELD

The present invention relates to a disc brake. More particularly, the present invention relates to a disc brake incorporating an arrangement for ensuring that brake pads are always fitted in their correct orientation, as well as to a brake pad having a suitable formation for use with such a brake.

BACKGROUND

It is known from EP0752541 (ArvinMeritor, Inc.) to provide formations on a pair of brake pads and corresponding features in abutment surfaces of a brake carrier to inhibit the brake being fully assembled with the pads orientated with the backplate thereof facing the brake disc. Incorrectly fitting brake pads in this manner is highly undesirable since the braking effectiveness of the brake is dramatically diminished and damage to the pad and brake disc may also occur.

In this patent, the two pads are identical and are provided with a formation that has rotational symmetry about an axis extending perpendicular to the rotational axis of the brake disc, so that although the pads cannot be fitted with the backplate facing the disc, the pads are interchangeable in an inboard and outboard sense.

In most applications such an arrangement is entirely satisfactory. However, the inventors have recognised that in some circumstances further measures may be required to ensure that in an "abuse" situation a user cannot forcibly refit the pad retainer. This situation may arise because the vertical height difference between the stepped pad abutments required to lift an incorrectly orientated pad is limited by the strength requirements of the brake carrier. A suitable step height in the pad assembly and corresponding carrier abutment 62, 63 for an optimised carrier and to prevent the incorrect installation can have a marked reduction in usable pad volume.

EP1473481 (BPW) discloses alternative pad foolproofing arrangements. In one embodiment, lugs having rotational, but not mirror symmetry are provided in a non-machined portion of the pad windows, proximate the machined surfaces. This location is undesirable as it is a high stress area of the carrier, and may result in uneven wear of the pad, as one of the two pistons exerts the same braking force, but over a lower pad area.

In another embodiment, the lugs have mirror symmetry and are configured only to extend into a corresponding cut-out in the metal backplate, but not the friction material. In both embodiments, a part-worn pad can be fitted in the incorrect window facing the wrong way.

In service, part worn pads may be removed and refitted, e.g. to inspect the pads for signs of cracking and glazing, so the applicant recognises that a real risk that impaired brake function may occur if such pads are wrongly fitted.

The present invention seeks to overcome or at least mitigate the problems of the prior art.

SUMMARY

A first aspect of the present invention provides a disc brake comprising: an actuation mechanism; a void for accommodating a disc brake rotor to be arranged to rotate about an axis; first and second brake pad mounting structures to be located, in use, adjacent opposing inboard and outboard faces respectively of a brake rotor to be braked; first and second brake pads located by the first and second mounting structures respectively such that upon application of the actuation mechanism the pads clamp the rotor and brake torque is reacted by the pad mounting structure; wherein to prevent or inhibit fitting of the first and second pads, individually or in combination with friction material facing away from the rotor the first and second mounting structures comprise first and second formations on radially inner faces thereof, which first and second formations extend radially outwards therefrom and do not have mirror symmetry about a plane defined by the centre of the rotor; wherein the formations are remote from abutment surfaces for supporting the first and second pad in a radial direction, and wherein a spacing axially between the rotor when in a fully worn condition, and formations is such that a fully worn pad having a complementary formation therein is only capable of being successfully fitted in with its remaining friction material facing the rotor.

By locating the formations away from the abutment surfaces, they are in a low stress location.

Preferably, the spacing axially between a fully worn rotor and the formations is such that an excessively worn pad having a complementary formation therein is only capable of being successfully fitted in with its remaining friction material facing the rotor.

The formations may be positioned so as to have rotational symmetry about an axis extending radially from a central position between the mounting structures.

The formation adjacent the rotor may be machined.

A face of the formation adjacent the rotor may have a clearance to the rotor when unworn of less than 4 mm, preferably less than 3 mm, more preferably less than 2 mm.

The actuation mechanism may comprise first and second pistons and the formations are positioned so as not to be contacted by the pistons in use.

The formations are preferably closer to a centre of the mounting structure than an end of the mounting structure.

Advantageously, the formations are proximate the centre of the mounting structure, preferably wherein the formations have a centre and the centre of the protrusions is within 20 mm of the centre of the mounting structure.

More preferably, a portion of the formation meets the centre of the mounting structure.

At least one of the inboard and outboard mounting structures may define a beam and the formation may extend axially towards the rotor beyond the beam.

Preferably, the outboard mounting structure defines a beam, which beam bows outboard at the centre thereof At least the inboard mounting structure may be provided on a fixed carrier portion of the brake. Preferably, both the inboard and outboard mounting structures are provided on a fixed carrier portion of the brake.

The first and second pads may further comprise substantially identical structures for attachment of pad springs.

The disc brake may further comprise an aperture for the fitting and removal of the pads in a radial direction; preferably wherein the aperture permits the fitting and removal of the pads to be achieved with the brake rotor being in place.

The pads are preferably configured to be retained radially in the mounting structures by a pad retainer, preferably wherein the pad retainer is prevented from being secured over the brake pads if at least one of the pads is incorrectly orientated.

A second aspect of the present invention provides a brake pad for fitment into a disc brake, the brake pad comprising: friction material mounted on a substantially rigid, generally planar backplate; the backplate defining a central axis extending generally parallel to a direction of insertion and removal of the backplate into the disc brake; the pad having a recess in the backplate and in the friction material in radially inner faces thereof; the recess being arranged to accommodate a corresponding protrusion in the disc brake to ensure the fitting of the pad in the correct orientation in the disc brake; and wherein the centre of the recess is offset from the central axis of the friction lining, and a portion of the recess reaches the central axis.

The friction material preferably comprises a channel extending therethrough in substantial alignment with the central axis.

BRIEF DESCRIPTION OF THE DRAWINGS

Embodiments of the invention will now be described with reference to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components.

Therefore, specific structural and functional details disclosed herein are not to be interpreted as limiting, but merely as a representative basis for teaching one skilled in the art to variously employ the present invention.

Figure 1:
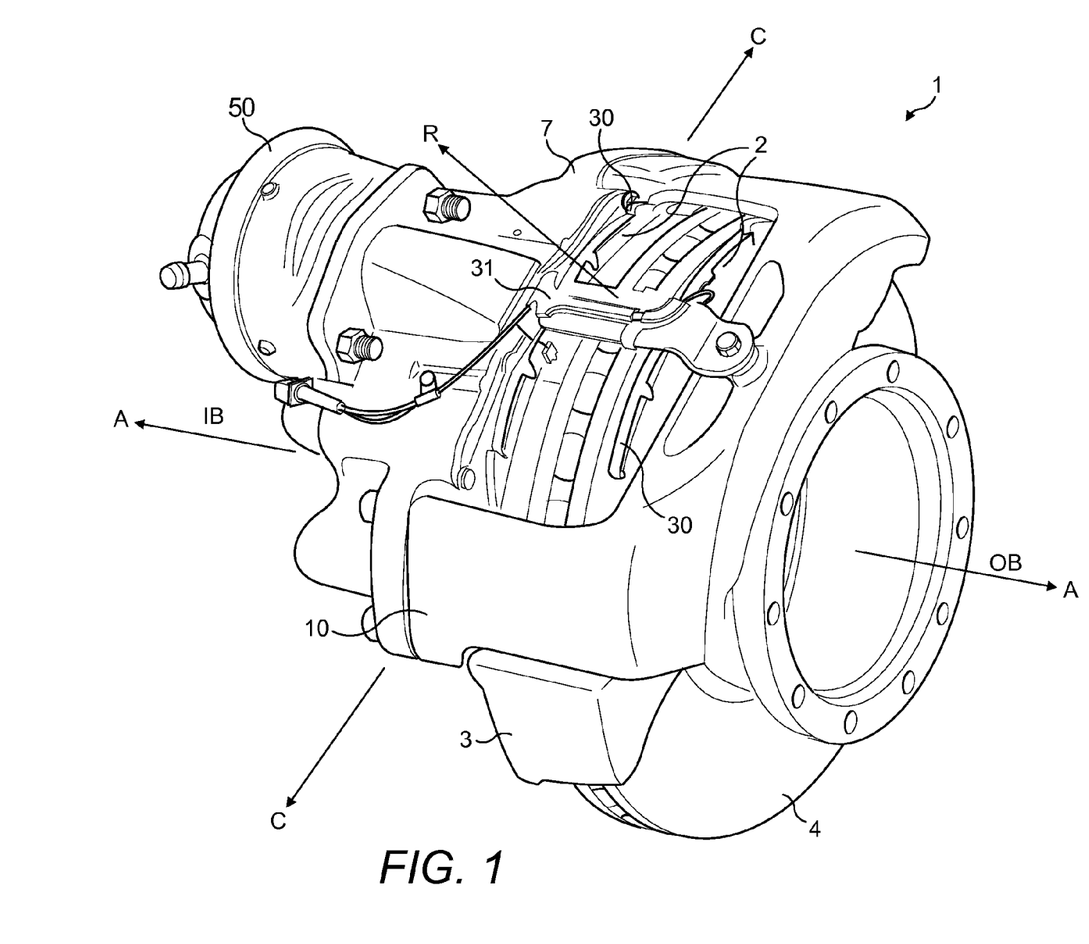
FIG. 1 is a perspective view of an air-actuated disc brake according to an embodiment of the present invention.
Figure 2:
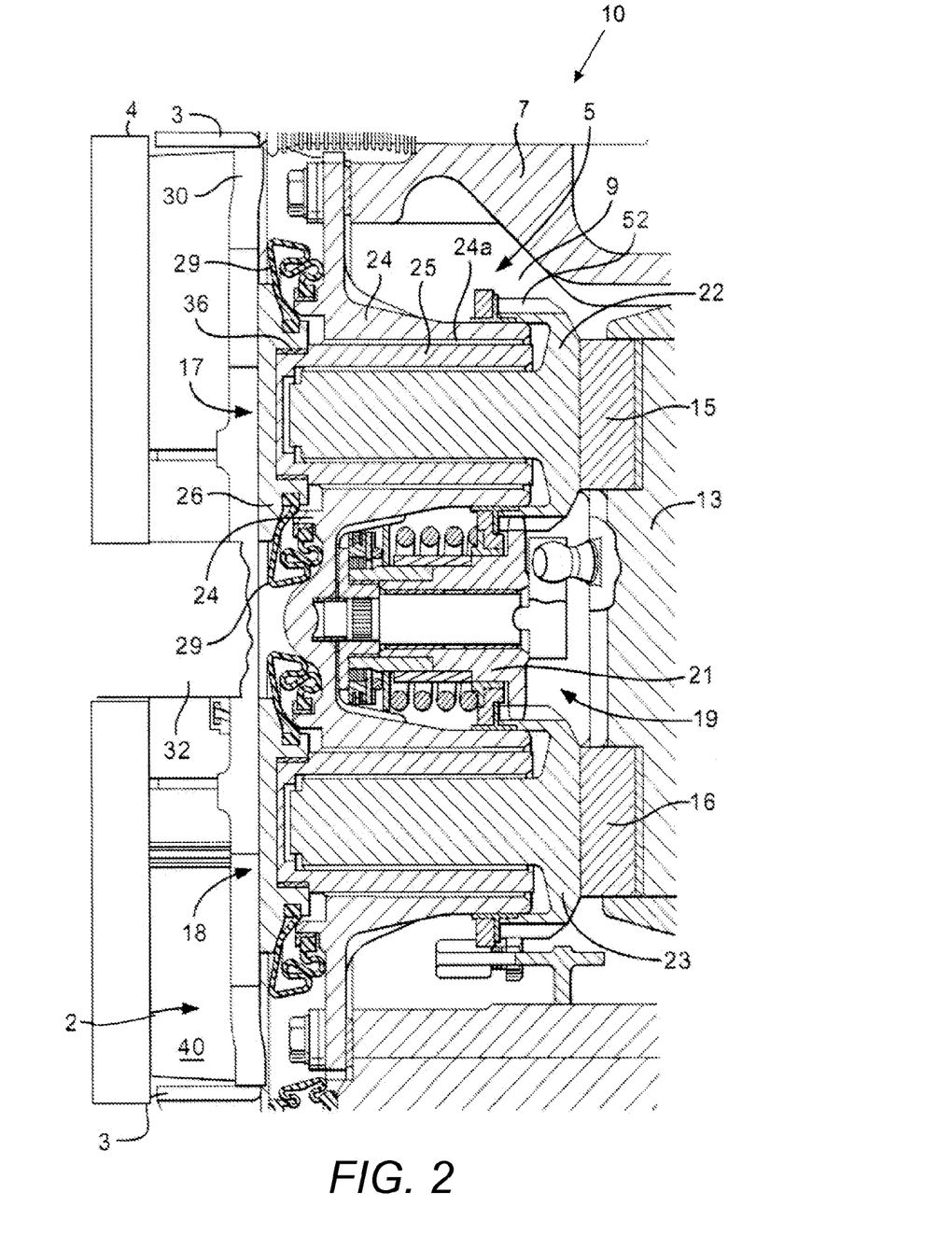
FIG. 2 is a partial cross-sectional view through a caliper, inboard brake pad and rotor of the brake of FIG. 1.
Figure 3:
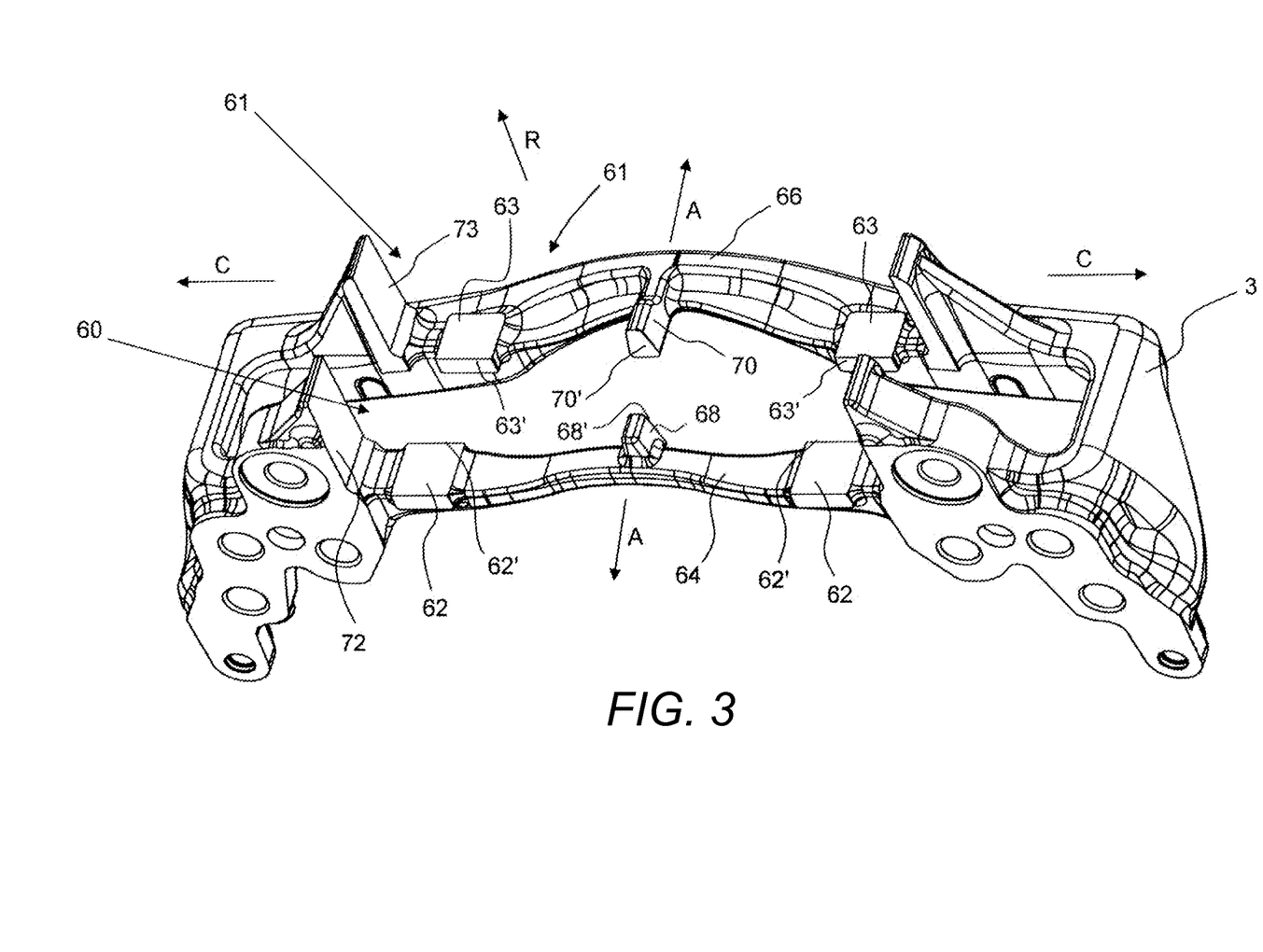
FIG. 3 is an isometric view of a carrier of the brake of FIG. 1.

With reference to FIGS. 1, 2 and 3, a brake 1 according to an embodiment of the present invention comprises a carrier 3 fixed to an axle or steering knuckle (not shown) in use, and has first and second brake pad mounting structures in the form of "windows" or radial openings 60, 61 for receiving identical inboard and outboard brake pads 2. The carrier 3 straddles a brake rotor 4 mounted for rotation about an axis A-A with a wheel to be braked (not shown). The outboard direction is indicated by OB and inboard by IB. Arrow R indicates a radial axis extending through the centre of the rotor 4 parallel to a direction of removal of brake pads 2. Arrows C indicate a circumferential direction normal to both axis A-A and axis R.

The brake further comprises a caliper 10 slidably mounted on the carrier for movement along axis A-A. The caliper 10 also straddles the rotor 4 and applies a clamp load to apply the brake and slow rotation of the wheel.

A known force transmission device 5 of the brake 1 is indicated generally at 5 in FIG. 2 and is of the type used in the present applicant's ELSA/EX range and is described to illustrate the general function of air disc brakes of this type. The device 5 is mounted within a chamber 9 of a housing 7 of a disc brake caliper 10. The housing 7 is adapted to mount a conventional air 50 or other power actuator—e.g. an electromechanical actuator (not shown) on an external face thereof An actuating lever (not shown) may perform an angular reciprocal swinging movement under the action of a thrust member of the power actuator, the lever being integral or attached to a rotary actuating member 13 (commonly referred to as an operating shaft) which is rotatably supported within the caliper. The member 13 is recessed to house respective cylindrical rollers 15, 16, the axes of which are offset from the rotary axis of the actuating member 13 and form an eccentric actuating arrangement. The rollers 15 and 16 bear against respective thrust assemblies, shown as adjustable piston assemblies, and indicated generally at 17 and 18 of the force transmission device 5.

Figure 7:
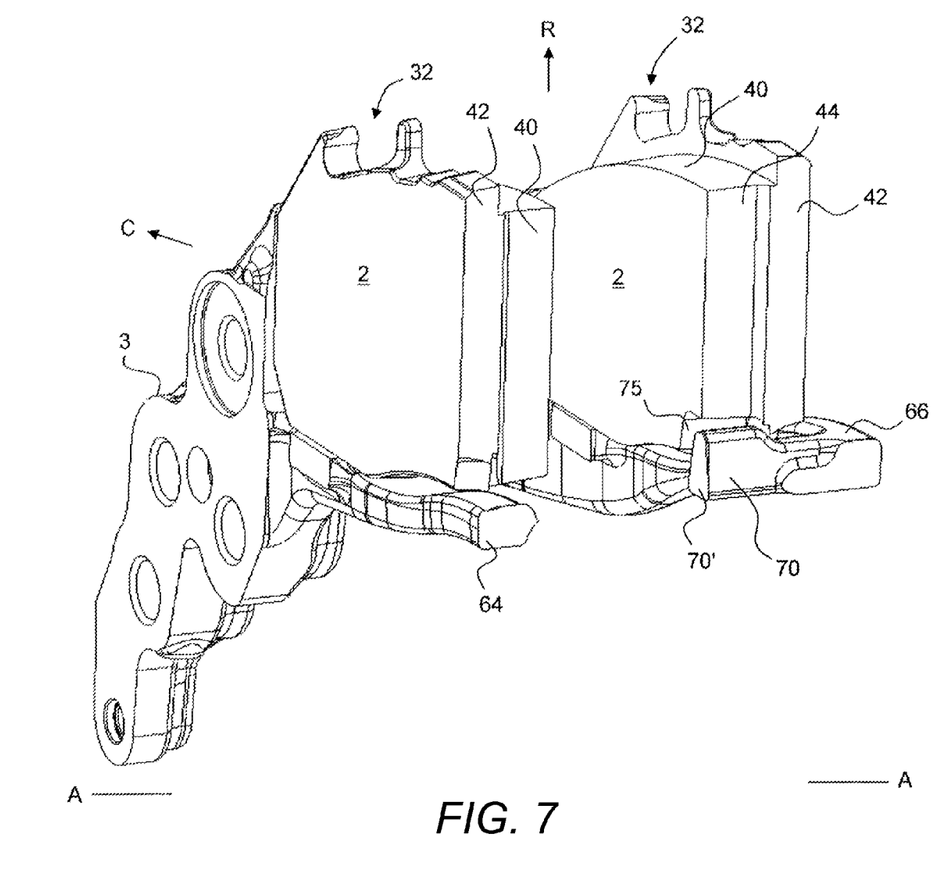
FIG. 7 is an isometric view in the plane 6-6 of FIG. 4, with brake pads in place.

Rotation of the lever and its connected member 13 causes actuating thrust to be applied via piston assemblies 17 and 18 parallel to axis A-A to an inboard directly actuated brake pad 2 and, by reaction via the caliper 10, to an indirectly actuated outboard brake pad (see FIG. 7). The brake pads are mounted so as to face respective sides of the brake rotor 4. The carrier 3 restrains the brake pads from circumferential movement in direction C and radial inward movement. Radial movement outward along axis R is restricted by pad springs 30 and a pad retainer 31.

An adjuster assembly is indicated generally at 19 and may be of any appropriate conventional type needing no detailed description. The adjuster responds to excessive movement of the brake pad 2 (e.g. due to wear of friction material 40 in use) and produces resultant rotation of an adjuster shaft 21 via gear 52 which in turn rotates a pair of inner tappets 22 and 23 of the adjustable piston assemblies 17 and 18.

When force is applied by the brake actuator from the right in FIG. 2, the entire piston assembly slides along bore 24a to transmit the braking force to the brake pad 2 via piston head 26. To adjust the length of the piston assembly 17, inner tappet 22 is rotated so as to cause relative axial movement between the inner tappet and the piston shaft 25 by virtue of the action of their mating threads. The outer piston has a non-circular profile to prevent rotation of the piston shaft 25 relative to the housing 24, thereby ensuring that rotation of inner tappet 22 results in actual lengthening of the piston assembly 17. Other force transmission devices are known, but operate using similar principles, and the present invention remains applicable thereto. Certain known force transmission devices use a single piston assembly, rather than two.

Figure 9:
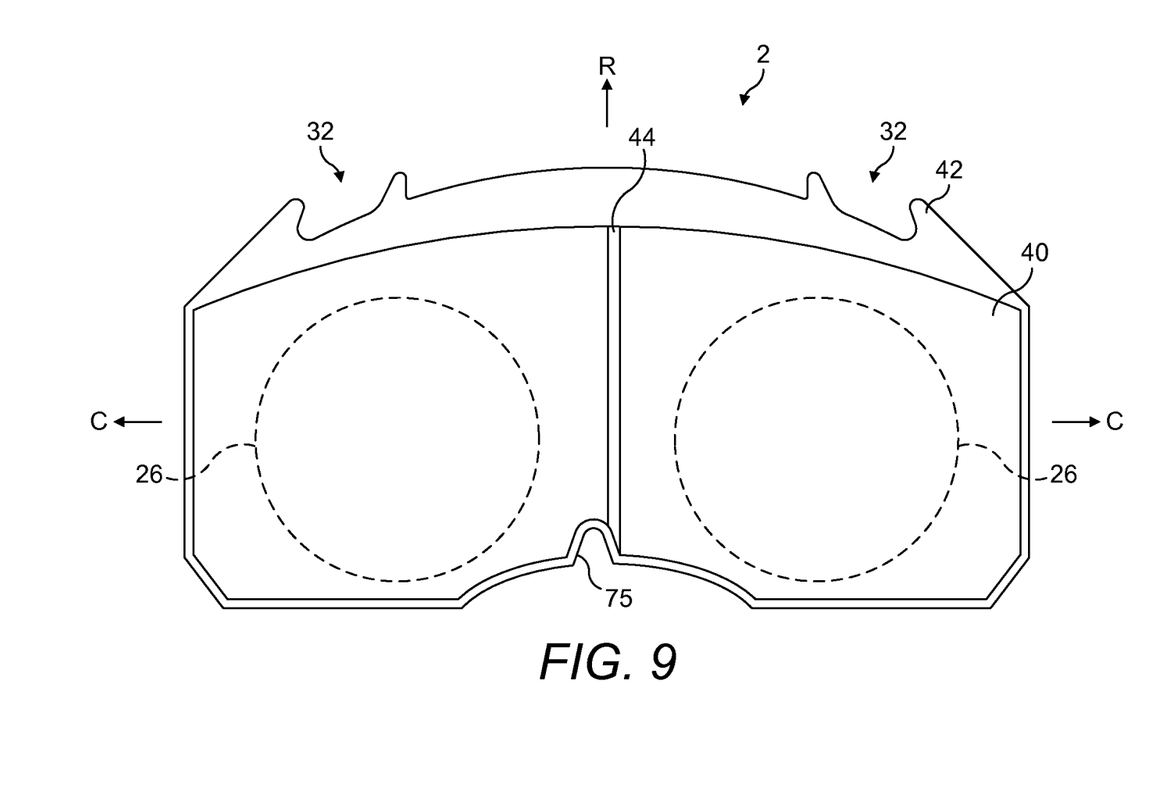
FIG. 9 is an end view of a brake pad according to an embodiment of the present invention.

With reference to FIGS. 7 and 9, brake pads 2 according to an embodiment of the present invention will now be discussed. In this embodiment, each brake pad 2 comprises a substantially planar cast iron backplate 42 of a generally rectangular shape and having a typical thickness of around 8-10 mm. In other embodiments stamped steel backplates having a typical thickness of around 6-10 mm may instead be used. Backplates of both types have suitable pad spring holding formations 32 for fixing pad springs 30 thereto. In alternative embodiments (not shown), the pad spring may be fixed to the pad retainer instead.

One face of each pad 2 has friction material 40 fixed thereto using a suitable mechanical keying arrangement. The friction material typically has a thickness of around 15-25 mm initially, and the pad is typically considered fully worn and in need of replacement once 2 mm of material remains (although this minimum threshold cannot always be guaranteed to be followed in the field).

In this embodiment a radially extending channel 44, extends through a portion of the depth friction material 40 at the centre of the friction material. Such channels are typically provided to inhibit unwanted cracking of the friction material occurring, caused by temperature or load stresses in use. In other embodiments pads 2 with no such channels, or two or more channels in other locations, may be provided.

With reference to FIG. 3, as the friction lining of the brake pad wears and the adjuster assembly extends the piston assemblies to maintain a suitable running clearance (typically 0.6-1.1 mm between each pad 2 and the rotor 4) the inboard pad 2 moves outboard along radial inboard abutment surfaces 62 and circumferential inboard abutment surfaces 72. Assuming equal friction material 40 wear on the inboard and outboard pads 2, and inboard and outboard faces of the rotor 4, the outboard pad 2 moves inboard on its radial 63 and circumferential 73 abutment surfaces, as the inboard pad moves out outboard on its radial 62 and circumferential 72 abutment, with the caliper tappets extending to compensate for the sum of all wear (including rotor).

In addition the brake rotor 4 wears, albeit at a slower rate, and may be considered fully worn once 3 mm is lost from each face.

As the piston assemblies 17, 18 extend, the piston heads move over the inboard brake pad window 60. In addition, wear causes the caliper 10 to move inboard with respect to the carrier and clearance in a radial direction R between an outboard portion of the caliper and an outboard carrier beam 66 is required.

Figure 4:
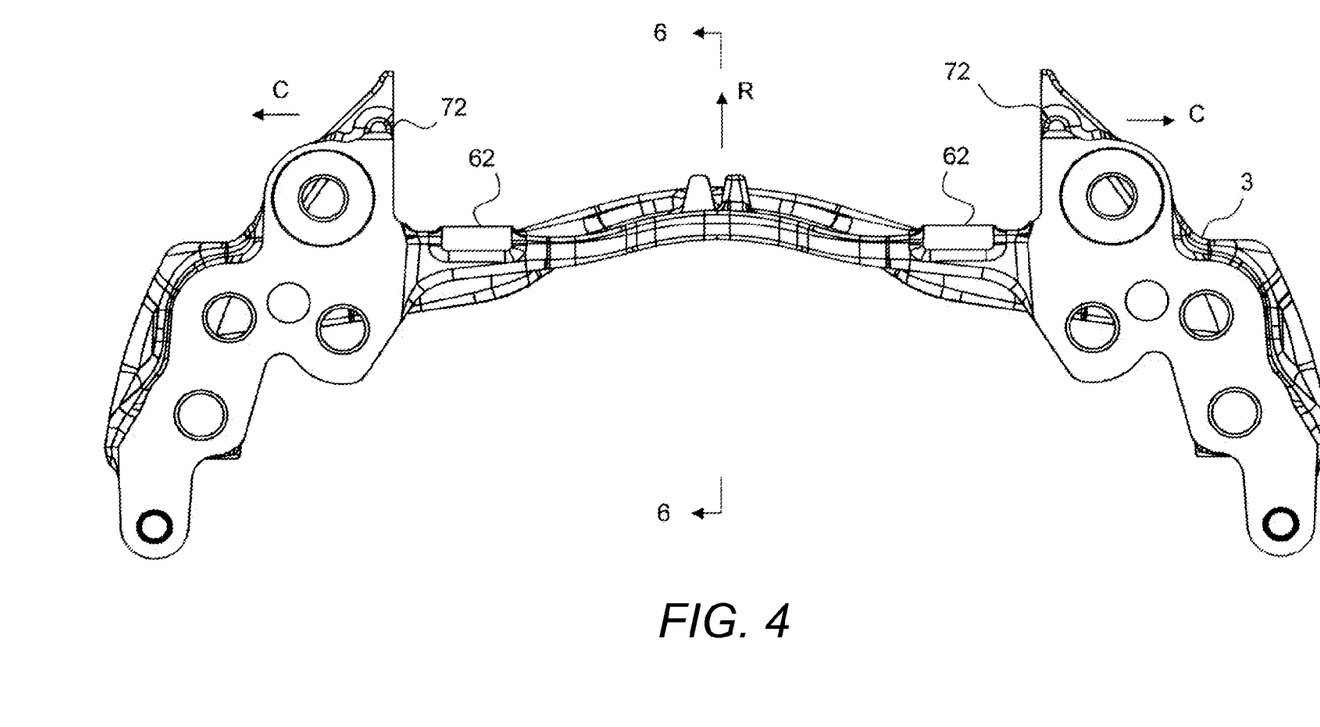
FIG. 4 is and end view of the carrier of FIG. 3 looking outboard along axis A-A.
Figure 5:
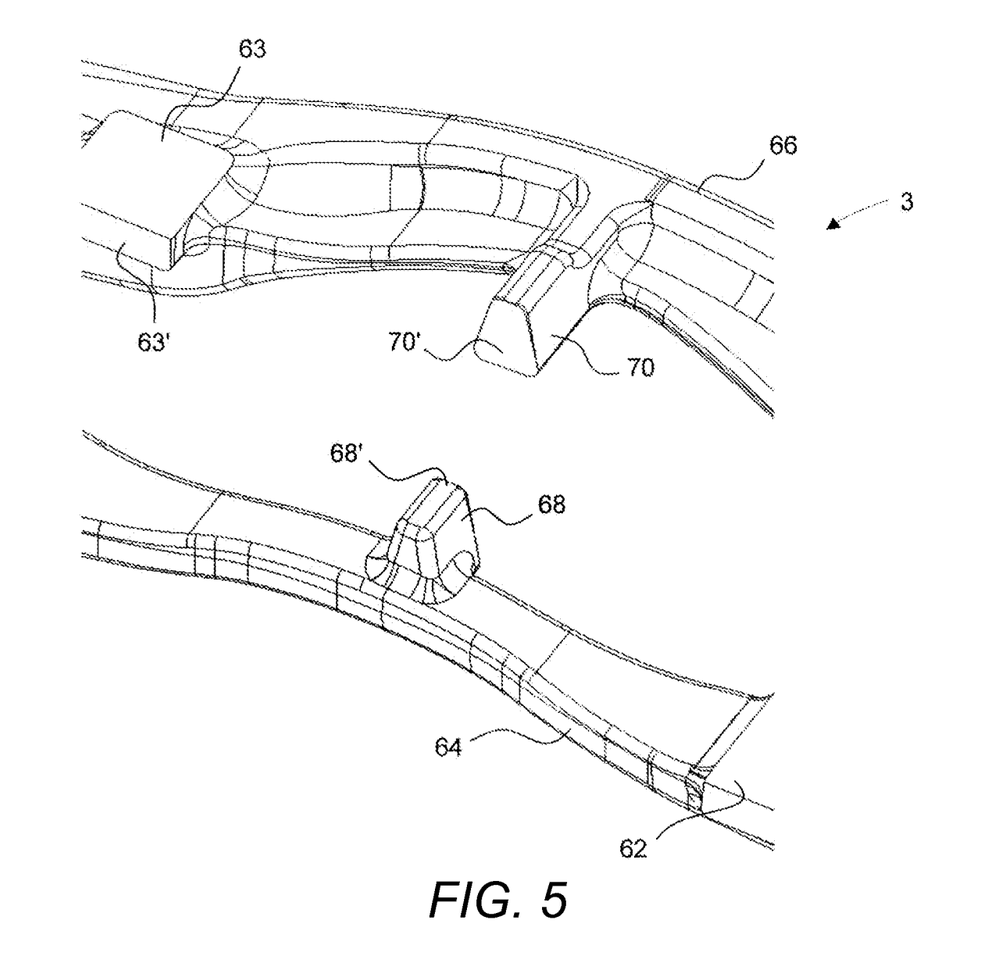
FIG. 5 is a detail view of the carrier of FIGS. 3 and 4.
Figure 6:
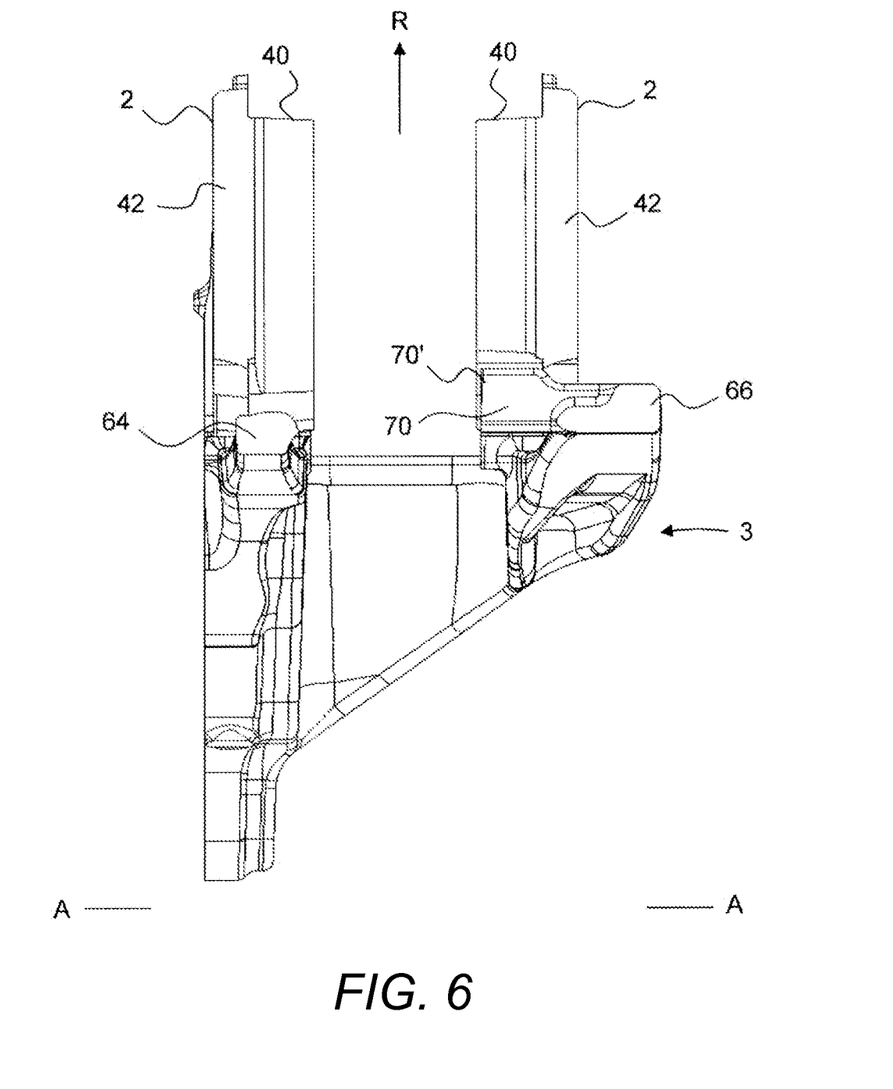
FIG. 6 is a cross-sectional view in the plane 6-6 of FIG. 4, with brake pads in place.

Turning to FIGS. 4-6 in particular, the construction of the carrier 3 is generally of a similar format to known carriers, but with some important differences in accordance with the present invention. In this embodiment the carrier is cast as a single iron component. In other embodiments, it may be formed from two or more components, one or more of which may be forged.

An inboard carrier beam 64 extends between the circumferential abutments 72. In a circumferential direction C the beam is substantially straight, but arches radially outwards at its centre. The cross-section of the inboard beam is relatively small in this embodiment as the majority of the drag load from the inboard brake pad 2 is taken by the axle mounting bracket/steering knuckle (not shown) to which the carrier is secured. The cross-section reduces in area towards the centre of the beam 64.

By contrast, in this embodiment, the outboard carrier beam 66 bows outboard on axis A-A and radially outwards, and has a thicker cross-section. The cross-section is a dog-leg profile, with a longer thinner leg extending along axis A-A and a thicker, shorter leg extending radially outwards parallel axis R. Greater strength is required by the outboard beam to withstand the drag loads generated by the outboard brake pad 2, and the outboard bowed shape and dog-leg profile has been found to provide an optimised strength to weight ratio.

The radial abutment surfaces 62, 63 are located proximate the circumferential surfaces 72, 73, but spaced therefrom.

The radial and circumferential abutment surfaces 62, 72, 63, 73 are cast with additional material and subsequently machined to provide suitably smooth and accurately dimensioned surfaces. In addition, the surfaces may be treated (e.g. induction hardened) for additional durability.

In this embodiment, faces 62' and 63' of the abutment surfaces that face the rotor (i.e. are generally parallel to axis R) are also machined in order to obtain a close enough tolerance to enable there to be a nominal clearance of approx. 1.5 mm between an unworn rotor and the faces 62' and 63' either side of the rotor.

As such, even if the rotor is in a fully worn condition (3 mm lost from each face), a 6 mm steel backplate is used, and the pad is worn until no friction lining remains, a 1.5 mm overlap exists between the pad and abutment surfaces, so the pad 2 is not ejected through the gap between rotor 4 and carrier. Of course, if it could be ensured that only thicker cast backplates 42 are used, a greater clearance—e.g. 3 mm may be provided, and in this instance there may be no need to machine the facing surfaces, since this allows for the greater tolerances inherent with cast components.

Figure 8:
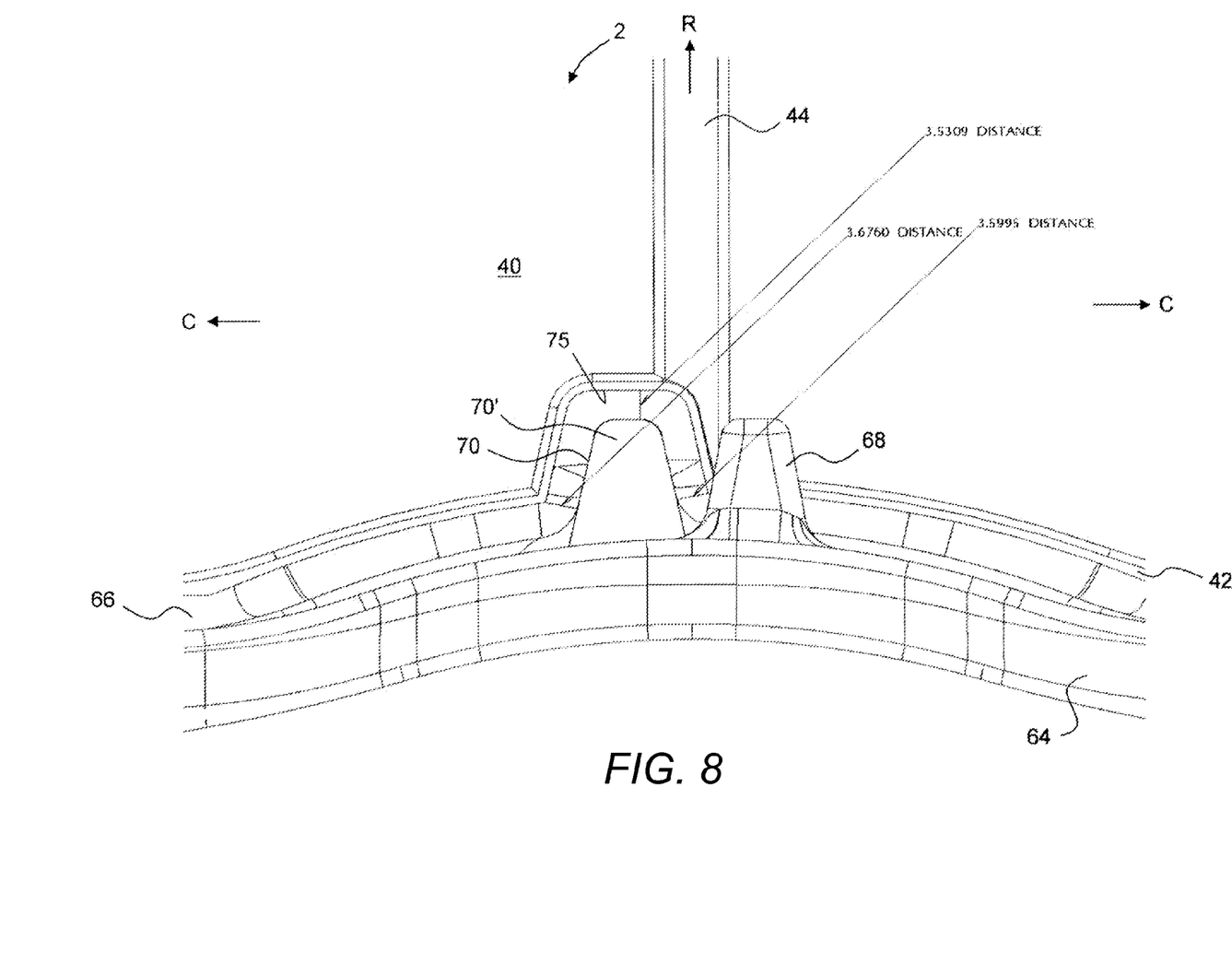
FIG. 8 is a detail end view looking outboard of the carrier of FIG. 3 along axis A-A with an outboard brake pad only in place.

With reference to FIGS. 5, 7 and 8, in order to "foolproof" brake pad 2 fitment, so the pads 2 can only be fitted radially inwardly into inboard and outboard windows 60 and 61 in the correct orientation during an assembly or maintenance operation, and the brake then fully assembled by securing the pads in place with the pad retainer in both unworn and worn conditions, the pads 2 comprise a recess 75 in a radially inner edge that extends through both the friction material 40 and backplate 42. The inboard and outboard carrier beams 64 and 66 include complementary formations in the form of protrusions 68 and 70.

The inboard protrusion 68 is cast integrally with the beam 64 and in this embodiment is a trapezoid with rounded corners and is of substantially constant cross-section in the A-A axis. The protrusion extends outboard beyond the beam and an outboard face 68' is machined to be substantially co-planar with abutment surface faces 62'. Advantageously, these faces 62' and 68' may be machined by the same tool in the same operation. As such face 68' has in this embodiment a nominal 1.5 mm clearance to an unworn rotor.

In this embodiment the protrusion 68 is located proximate the centre of the beam 64 (where a plane defined by axes R and A intersects the beam at 90°), but is offset slightly to the right as viewed in FIG. 8 (by approximately 7.2 mm to the centre of the protrusion in this embodiment). Indeed, in this embodiment, the base of the protrusion meets the beam at the centre thereof The outboard protrusion 70 is of substantially identical cross-section to the inboard protrusion 68 and extends inboard from outboard beam 66 and terminates in the same plane as faces 63' of the outboard radial abutment surfaces 63 (i.e. to also have a nominal 1.5 mm clearance from the outboard face of rotor 4), having been machined in a similar operation. As the outboard beam 66 bows outboard, the distance the protrusion 70 is cantilevered inboard from the beam along axis A-A is greater than for protrusion 68. Further, the length parallel axis A-A for which the protrusion 70 is above the level of the outboard beam 66 is greater than the equivalent for protrusion 68, in order to account for the additional travel of the outboard pad 2 with respect to the carrier 3. In this embodiment, the outboard protrusion length is 15 mm, and the inboard 13.6 mm.

The outboard protrusion 70 is also proximate the centre of beam 66, but is offset to the left by the same amount inboard protrusion 68 is offset to the right (7.2 mm).

In other words, the protrusions 68 and 70 have rotational symmetry about axis R, but do not have mirror symmetry about a plane defined by R and direction C.

In this embodiment, the height differential between the radial abutment surfaces 62 and 63 and the tops of the protrusions is 20.9 mm. The height of the protrusions 68, 70 is typically limited by the clearance between the outboard beam 66 and the caliper because the caliper may move over the beam when the pads 2 become worn.

The brake pads are identical, and the recess 75 therein is essentially the same shape as the protrusions 68 and 70, but is larger in both width and height to provide sufficient clearance that in normal usage the protrusions do not contact the pads 2 and therefore interfere with normal operation thereof. In this embodiment, the clearance is around 3.5 mm in order to account for clearance circumferentially of the pads 2 within windows 60 and 61, tolerances in the backplates 42 and protrusions 68, 70, and heat expansion etc.

As the friction material 40 is set back from the perimeter of the backplate 42 by approx. 0.5 mm, the recess in the friction material is slightly larger than in the backplate.

As the recess 75 is somewhat larger than the protrusions 68, 70, it can be seen that in this embodiment it crosses the centre of the pad (i.e. crosses a plane defined by axes R and A). This has a number of benefits for the pad of the present invention. Firstly, the impact of the recess on the swept pad area is minimised, as a portion of the area removed falls within the channel 44.

Further, it avoids there being a relatively thin and therefore weak portion of friction material being left between channel 44 and the recess 75, which could be broken off in service, reducing the swept pad area. Additionally, the protrusions are located in a relatively low stress area of the carrier 3.

Theoretically, it is possible to move the recess 75 further away from the centre of the pad 2. However, as illustrated in FIG. 9, the scope for doing so is limited by the position of the piston heads 26. Given the heads extend over the inboard beam when the pads are worn, the recesses cannot be located within the dotted area, or will be hit by the heads. As such, the applicant has recognised this near central location, as opposed to a location proximate the radial pad abutments to be advantageous for a number of functional reasons.

Figure 10:
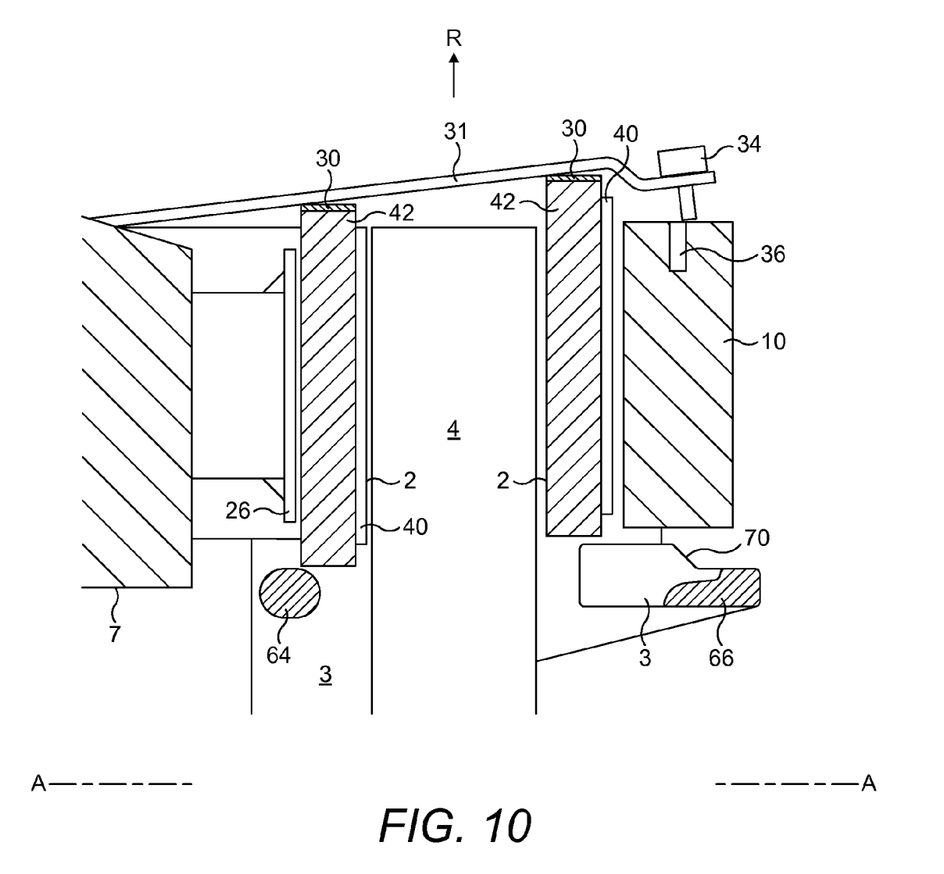
FIG. 10 is a schematic cross-sectional view through the brake on a radial centreline of FIG. 1 with the outboard brake pad incorrectly orientated.

FIG. 10 shows the effectiveness of the foolproofing, even with fully worn brake pads 2 (2 mm of friction material remaining) and a fully worn rotor 4 (3 mm wear to each face). As illustrated the inboard pad 2 has been correctly fitted with friction material facing the rotor 4 as the protrusion 68 locates within recess 75. However, the outboard pad has been placed into the outboard window 61 with backplate 42 facing the rotor. If successfully fitted in this orientation, this incorrect fitting would significantly impair the ability of brake to stop the vehicle to which it is fitted.

However, as can be seen the protrusion 70 does not locate within the recess, and there remains sufficient overlap between the backplate 42 and the protrusion for the protrusion to prevent the backplate 42 from being able to seat on the radial abutment surfaces 63. In this radially elevated position of the pad 2 of around 9 mm, the pad retainer 31, which hooks into a recess on the housing 7, is tilted outwardly to the extent that even with the pad springs 30 depressed, a pad retainer bolt 34 is unable to engage with a complementary threaded bore 36 in the caliper 10. As a result re-assembly is prevented and the brake fitter is alerted to their error and therefore able to correct it.

FIGS. 11A to 11F illustrate various alternative shapes of recess to be used with complementary projections on the inboard and outboard beams.

Figure 11A:
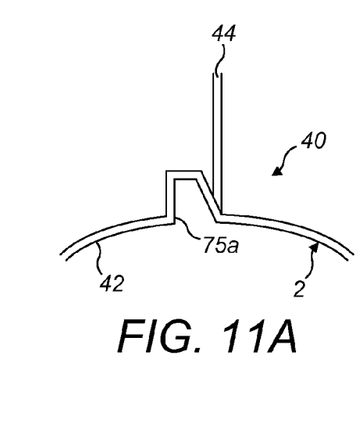
FIGS. 11A to 11F are detail views of portions of brake pads according to further embodiments of the present invention, incorporating various alternative recess shapes.
Figure 11B:
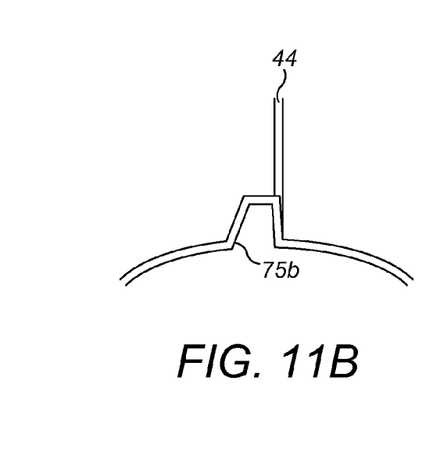
Figure 11C:
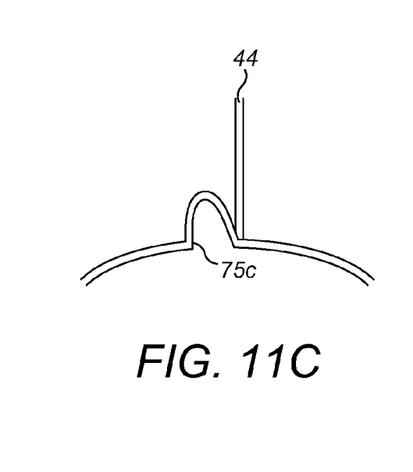
Figure 11D:
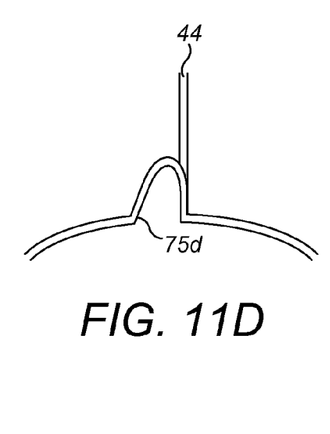
Figure 11E:
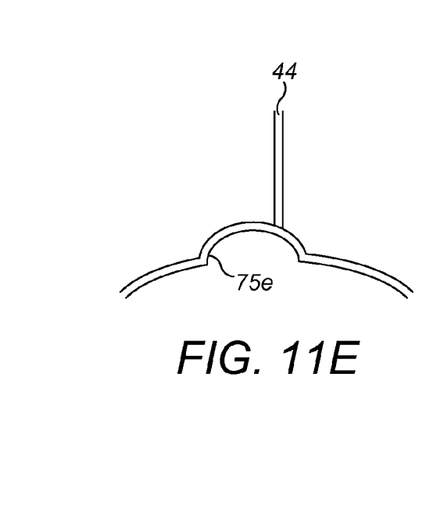
Figure 11F:
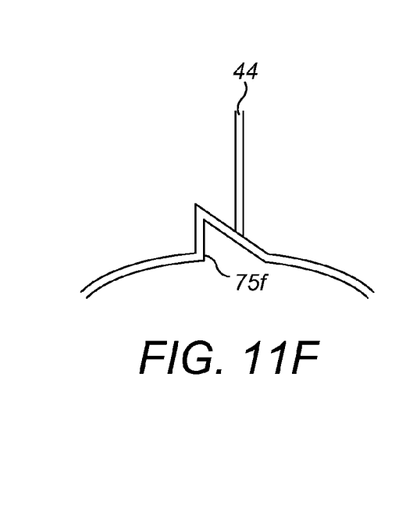

Recesses 75*a* and 75*b* FIGS. 11A and 11B are similar to recess 75, but the angles of the trapezoid are unequal. Recesses 75*c* and 75*d* are non-symmetrical curves, recess 75*e* is a shallower curve that extends partially into the friction material on the other side of channel 44, and recess 75*f* is triangular and also crosses the channel 44. It will be appreciated that numerous other recess shapes may be utilised, and that through careful selection thereof, they may be used not only for foolproofing, but also to ensure that pads of a particular specification for one brake model are not useable on other models for which they are not intended.

It will be appreciated that the dimensions referred to above are used for illustrative purposes, and will vary dependent upon the size and geometry of the brake to which the present invention is applied. The term "fully worn pad" is intended to refer to a pad which has reached its minimum design limit for the amount of friction material remaining thereon—i.e. in the specific embodiment above, 2 mm of friction material. The term "excessively worn pad" is intended to mean a pad that has less than the minimum design limit of friction material remaining—e.g. 1 mm or 0.5 mm.

Numerous benefits of the present invention are achieved with brake pads that do not utilise a central channel, and with recesses located elsewhere in the space between the two piston heads.

Although the invention has been described above with reference to one or more preferred embodiments, it will be appreciated that various changes or modifications may be made without departing from the scope of the invention as defined in the appended claims. For example, similar principles may be applied to arrangements that have neither rotational nor mirror symmetry—e.g. to prevent pads being fitted in the wrong orientation as well as the wrong location. An example of this may be where pads inboard and outboard have different strengths or other dissimilar properties, and it would be detrimental to brake operation for the inboard pad to be fitted outboard and/or vice versa.

The faces of the protrusions that are adjacent the rotor faces may have a greater clearance if used only with thicker cast backplate brake pads—e.g. around 3 mm. In this embodiment, machining of the faces may not be required.

The present invention remains applicable for the inboard pad and window at least for brakes in which the outboard pad is mounted solely by the caliper, and only the inboard pad is located circumferentially and radially by the carrier.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A disc brake comprising:
an actuation mechanism;
a brake rotor arranged to rotate about an axis;
first and second brake pad mounting structures to be located, in use, adjacent opposing inboard and outboard faces, respectively, of the brake rotor;
first and second brake pads located by the first and second brake pad mounting structures, respectively, wherein upon application of the actuation mechanism the first and second brake pads clamp the brake rotor and brake torque is reacted by the first and second brake pad mounting structures;

wherein to prevent or inhibit fitting of the first and second brake pads, individually or in combination with friction material facing away from the brake rotor, the first and second brake pad mounting structures include first and second formations on radially inner faces thereof, which first and second formations extend radially outwards therefrom and do not have mirror symmetry about a plane defined by a center of the brake rotor and normal to the axis;

wherein the first and second formations are remote from abutment surfaces that support the first and second brake pads in a radial direction;

wherein the first brake pad in a fully worn condition is successfully fittable on the first brake pad mounting structure with its friction material facing the brake rotor when the first formation is received in a first complimentary formation on the first brake pad;

wherein there is a spacing axially between the brake rotor and the first formation when the brake rotor is in a fully worn condition and wherein the first brake pad in the fully worn condition is not insertable between the first formation and the brake rotor in the fully worn condition; and wherein the first and second brake pads include:
friction material mounted on a substantially rigid, generally planar backplate, the backplate having a radially inner edge, a radially outer edge, two opposing side edges that each extend from the radially inner edge and the radially outer edge, and a center line centered between the two opposing side edges that defines a central axis extending generally parallel to a direction of insertion and removal of the backplate into the disc brake;

a recess in the backplate and in the friction material in radially inner faces thereof, wherein the radially inner faces each have a curved portion having a first end and a second end disposed opposite the first end and the recess extends from the curved portions and is disposed between and spaced apart from the first and second ends;

wherein the recess is arranged to accommodate a corresponding one of the first and second formations in the form of a protrusion in the disc brake to ensure fitting of the brake pad in a correct orientation in the disc brake; and wherein a center of the recess is offset from the central axis of the friction material, and a portion of the recess reaches the central axis.

2. The disc brake according to claim 1 wherein there is a spacing axially between a fully worn brake rotor and the first and second formations and wherein an excessively worn brake pad having a complementary formation is only capable of being successfully fitted with its remaining friction material facing the brake rotor.

3. The disc brake according to claim 1 wherein the first and second formations are positioned to provide rotational symmetry about an axis extending from a central position between the first and second brake pad mounting structures and extending generally parallel to a direction of insertion and removal of the first and second brake pads.

4. The disc brake according claim 1 wherein a face of either the first formation or the second formation that is disposed adjacent to the brake rotor has a clearance to the brake rotor when unworn of less than 4 mm.

5. The disc brake according to claim 1 wherein a portion of the first and second formations meets the center of the first and second brake pad mounting structures, respectively.

6. The disc brake according to claim 1 wherein at least one of the first and second brake pad mounting structures defines a beam and the first or second formations extend axially towards the brake rotor beyond the beam.

7. The disc brake according to claim 1 wherein the second brake pad mounting structure defines a beam that bows outboard away from the brake rotor at a center thereof.

8. The disc brake according to claim 1 wherein at least the first brake pad mounting structure is provided on a fixed carrier portion of the disc brake.

9. The disc brake according to claim 8 wherein both the first and second brake pad mounting structures are provided on the fixed carrier portion of the disc brake.

10. The disc brake according to claim 1 further comprising a caliper having an aperture for the fitting and removal of the first and second brake pads in the radial direction.

11. The disc brake according to claim 1 wherein the first and second brake pads are each retained radially in the first and second brake pad mounting structures, respectively, by a pad retainer.

12. The disc brake according to claim 11 wherein the pad retainer is prevented from being secured over the first and second brake pads when at least one of the first and second brake pads is incorrectly orientated.

13. The disc brake of claim 1 wherein the inboard face of the brake rotor is fully worn once it has lost 3 mm of material.

14. The disc brake of claim 1 wherein the first brake pad is fully worn once 2 mm of friction material remains and the second brake pad is fully worn once 2 mm of friction material remains.

15. A brake pad for fitment into a disc brake, the brake pad comprising:
friction material mounted on a substantially rigid, generally planar backplate, the backplate having a radially inner edge, a radially outer edge, two opposing side edges that each extend from the radially inner edge and the radially outer edge, and a center line centered between the two opposing side edges that defines a central axis extending generally parallel to a direction of insertion and removal of the backplate into the disc brake;

a recess in the backplate and in the friction material in radially inner faces thereof, wherein the radially inner faces each have a curved portion having a first end and a second end disposed opposite the first end and the recess extends from the curved portions and is disposed between and spaced apart from the first and second ends;

wherein the recess is arranged to accommodate a corresponding protrusion in the disc brake to ensure the fitting of the brake pad in a correct orientation in the disc brake; and wherein a center of the recess is offset from the central axis of the friction material, and a portion of the recess reaches the central axis.

16. The brake pad according to claim 15, wherein the friction material comprises a channel extending therethrough in substantial alignment with the central axis.

17. The brake pad of claim 15 wherein the backplate further comprises spring holding formations.

18. The brake pad of claim 17 wherein the spring holding formations are provided on the radially outer edge of the backplate.

19. The brake pad of claim 15 wherein the backplate has a thickness in a range of 6 mm to 10 mm.

20. A disc brake comprising:
- a brake rotor that is rotatable about an axis and that has opposing inboard and outboard faces;
- first and second brake pad mounting structures located adjacent to the inboard and outboard faces, respectively, wherein the first and second brake pad mounting structures each have a protrusion;
- first and second brake pads located by the first and second brake pad mounting structures, respectively, wherein the first and second brake pads include:
  - friction material mounted on a substantially rigid, generally planar backplate, the backplate having a radially inner edge, a radially outer edge, two opposing side edges that each extend from the radially inner edge and the radially outer edge, and a center line centered between the two opposing side edges that defines a central axis extending generally parallel to a direction of insertion and removal of the backplate into the disc brake; and
  - a recess in the backplate and in the friction material in radially inner faces thereof, wherein the radially inner faces each have a curved portion having a first end and a second end disposed opposite the first end and the recess extends from the curved portions and is disposed between and spaced apart from the first and second ends, wherein the recess is arranged to accommodate the protrusion that is provided with the corresponding first and second brake pad mounting structures to ensure fitting of the first and second brake pads in a correct orientation in the disc brake, and a center of the recess is offset from the central axis of the friction material, and a portion of the recess reaches the central axis.

\* \* \* \* \*